United States Patent
Purdon

(10) Patent No.: US 9,021,643 B2
(45) Date of Patent: May 5, 2015

(54) CURB RAMP

(71) Applicant: Roger Anthony Purdon, Cold Spring Harbor, NY (US)

(72) Inventor: Roger Anthony Purdon, Cold Spring Harbor, NY (US)

( * ) Notice: Subject to any disclaimer, the term of this patent is extended or adjusted under 35 U.S.C. 154(b) by 0 days.

(21) Appl. No.: 13/689,693

(22) Filed: Nov. 29, 2012

(65) Prior Publication Data

US 2013/0133143 A1  May 30, 2013

Related U.S. Application Data

(60) Provisional application No. 61/565,174, filed on Nov. 30, 2011.

(51) Int. Cl.
  *E01D 1/00* (2006.01)
  *B65G 69/30* (2006.01)

(52) U.S. Cl.
  CPC ...................... *B65G 69/30* (2013.01)

(58) Field of Classification Search
  CPC ........ B65G 69/30; A61G 3/063; B63B 27/14; B60P 1/43; B60P 1/431; B60P 1/433; B60P 1/435; B66F 7/243
  USPC ........... 14/69.5, 71.1, 72.5; 414/537; D34/32; 254/88
  See application file for complete search history.

(56) References Cited

U.S. PATENT DOCUMENTS

| | | | | |
|---|---|---|---|---|
| 648,620 A | * | 5/1900 | Holmes | 104/30 |
| 2,450,648 A | * | 10/1948 | Felzer | 254/88 |
| 3,153,798 A | * | 10/1964 | Drevitson | 14/69.5 |
| 3,285,447 A | * | 11/1966 | Junion | 414/469 |
| 3,460,176 A | * | 8/1969 | Alten | 14/72.5 |
| 5,033,146 A | * | 7/1991 | Fogarty et al. | 14/69.5 |
| 5,065,468 A | * | 11/1991 | Sherrod | 14/72.5 |
| 5,390,775 A | * | 2/1995 | Herrick et al. | 193/35 R |
| RE34,889 E | * | 4/1995 | Fogarty et al. | 14/69.5 |
| 5,483,715 A | * | 1/1996 | Fogarty et al. | 14/69.5 |
| 6,708,361 B1 | * | 3/2004 | Emerson, Jr. | 14/69.5 |
| 6,745,422 B1 | * | 6/2004 | Emerson, Jr. | 14/69.5 |
| 7,003,836 B2 | * | 2/2006 | Berg | 14/69.5 |
| 7,571,507 B2 | * | 8/2009 | Holicki | 14/69.5 |
| 8,127,389 B1 | * | 3/2012 | Hannam | 14/69.5 |
| 2002/0108190 A1 | * | 8/2002 | Martinez | 14/69.5 |
| 2005/0132511 A1 | * | 6/2005 | Berg | 14/69.5 |
| 2005/0281642 A1 | * | 12/2005 | Green et al. | 414/332 |
| 2007/0294844 A1 | * | 12/2007 | Gunnarson et al. | 14/69.5 |
| 2008/0201873 A1 | * | 8/2008 | Haimoff | 14/69.5 |

OTHER PUBLICATIONS

Vestil Manufacturing Corporation, Roll-O Ramp with Wheels, Jul. 21, 2009, https://web.archive.org/web/20090721114827/http://www.vestilmfg.com/products/ldsol/wheelchair.htm.*

* cited by examiner

*Primary Examiner* — Abigail A Risic

(57) ABSTRACT

A curb ramp can be positioned next to a curb or a raised walkway to allow a cart to be wheeled up or down the curb ramp to or from the curb. The curb ramp allows people and equipment to move safely up or down a curb or walkway. The curb ramp can have a length at least as long as the wheel base of a cart used on the curb ramp to prevent tail drag of the cart. The curb ramp can include side rails to prevent sideways fall off therefrom. The curb ramp includes a curb-stop piece that is disposed against the curb during use and a plurality of cross braces to support and carry the load. A strong, effective and safe curb ramp can accommodate all wheeled devices that people can push or pull thereover, while being light enough to be easily transported and moved as needed.

6 Claims, 3 Drawing Sheets

CURB RAMP

CROSS-REFERENCE TO RELATED APPLICATION

This application claims the benefit of priority of U.S. provisional application No. 61/565,174, filed Nov. 30, 2011, the contents of which are herein incorporated by reference.

BACKGROUND OF THE INVENTION

The present invention relates to curb ramps and, more particularly, to a curb ramp useful for transport of carts up, over and down curb heights smoothly and safely.

In the last two years, there has been a significant change in the ordering and merchandising process in big box retail outlets' garden departments. Most vendors are now selling their goods on a consignment basis. New and very large volumes are brought in to the store, resulting in overflow from the original sales spaces spreading into the adjacent parking areas. In these areas, live goods carts that are approximately 22 inches wide, 56 inches long and 7 feet high are arranged for shopping, forcing customers to negotiate stepping off curbs from 5 inches to 8 inches in height with heavy carts. This configuration also forces workers to force heavy plant carts over curbs or walk them around at some distance. Customer safety, worker safety and merchandise safety are all compromised.

Conventional ramps are not designed for use for moving live goods carts over curbs. If the ramp is too short, tail drag can prevent movement of the cart. If the ramp is too long, it becomes heavy and difficult to move from place to place.

As can be seen, there is a need for a ramp for moving live goods carts, shopping carts and people safely and securely over curbs.

SUMMARY OF THE INVENTION

In one aspect of the present invention, a curb ramp comprises a deck platform; side supports disposed on each side of the deck platform, the side supports extending above an upper plane of the deck platform to prevent a load from sliding off the sides of the deck platform; a curb stop piece disposed on a raised end of the deck platform; and a plurality of braces disposed under the deck platform.

In another aspect of the present invention, a curb ramp comprises a deck platform having a non-slip surface; side supports disposed on each side of the deck platform, the side supports extending above an upper plane of the deck platform to prevent a load from sliding off the sides of the deck platform; a curb stop piece disposed on a raised end of the deck platform; an end brace, at least one short brace, and at least one long internal brace disposed under the deck platform; at least one roller bearing disposed in at least one of the side supports; and at least one ball transfer unit disposed in at least one of the side supports.

These and other features, aspects and advantages of the present invention will become better understood with reference to the following drawings, description and claims.

DETAILED DESCRIPTION OF THE INVENTION

Figure 1:
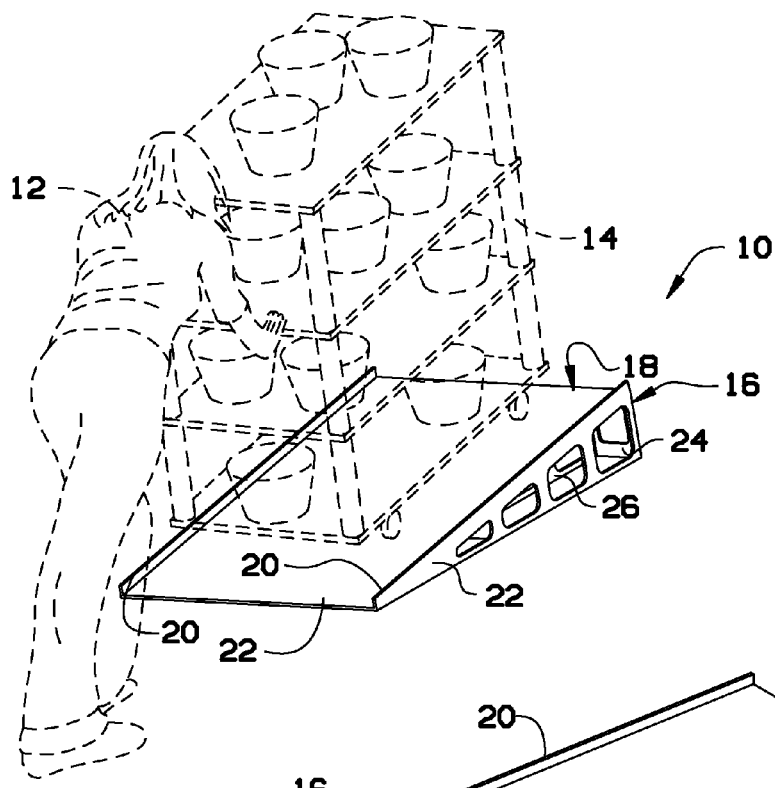
FIG. 1 is a perspective view of a curb ramp, in use, according to an exemplary embodiment of the present invention.
Figure 2:
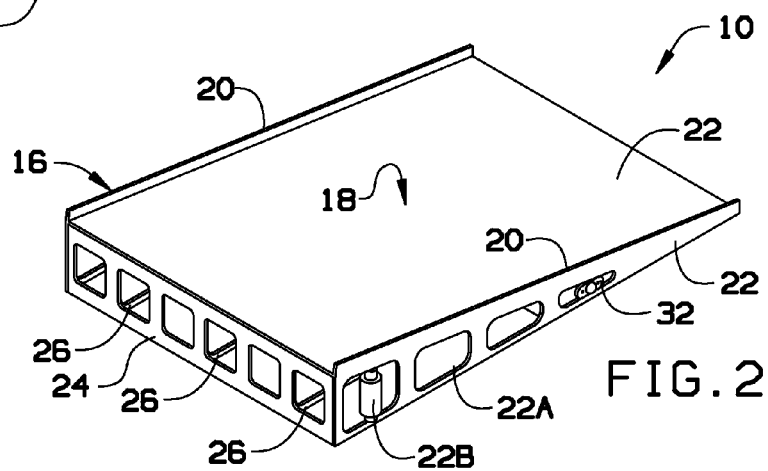
FIG. 2 is a rear perspective view of a curb ramp having optional ball and barrel transfer units, according to an exemplary embodiment of the present invention.
Figure 3:
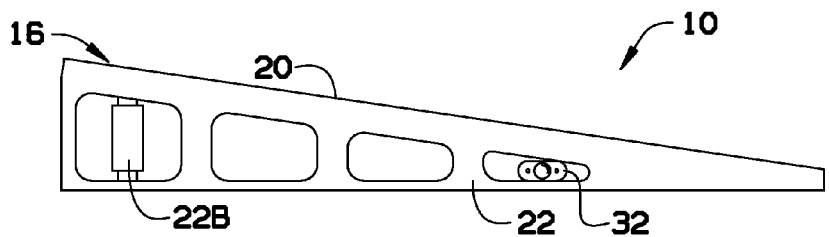
FIG. 3 is a side view of the curb ramp of FIG. 2.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a curb ramp that can be positioned next to a curb or a raised walkway, for example, to allow a cart to be wheeled up or down the curb ramp to or from the curb. The curb ramp also allows people and equipment to move safely up or down a curb or walkway. The curb ramp can have a length at least as long as the long wheel base of a cart used on the curb ramp to prevent tail drag of the cart. The curb ramp can also include side rails to prevent sideways fall off from therefrom. The curb ramp includes a curb-stop piece that is disposed against the curb during use and a plurality of cross braces to support and carry the load. The result is a strong, effective and safe curb ramp, about 30 inches wide, that can accommodate all wheeled devices that people can push or pull thereover, while being light enough to be easily transported and moved as needed.

Referring now to FIGS. 1 through 5, a curb ramp 10 can include a deck platform 18 sloped from a base level to a predetermined height. This predetermined height can be a curb height at a desired location. The deck platform 18 can be used to permit an operator 12 to move a load 14, such as a horticultural cart, or other wheeled cart, up the ramp assembly 16. Typically, the deck platform 18 can be formed from a non-slip material or can be coated with a non-slip surface coating, such as a non-slip paint, for example.

A curb stop piece 24 can be disposed at a raised end of the deck platform 18, extending toward the ground. The curb stop piece 24 prevents the ramp assembly 16 from riding up the curb while pushing a load 14 up the deck platform 18.

The deck platform 18 can include side supports 22 attached to the deck platform 18 or formed integrally with the deck platform. The side supports 22 can extend beyond a surface of the deck platform 18 to prevent the load 14 from being wheeled off the sides of the ramp assembly 16.

Figure 4:
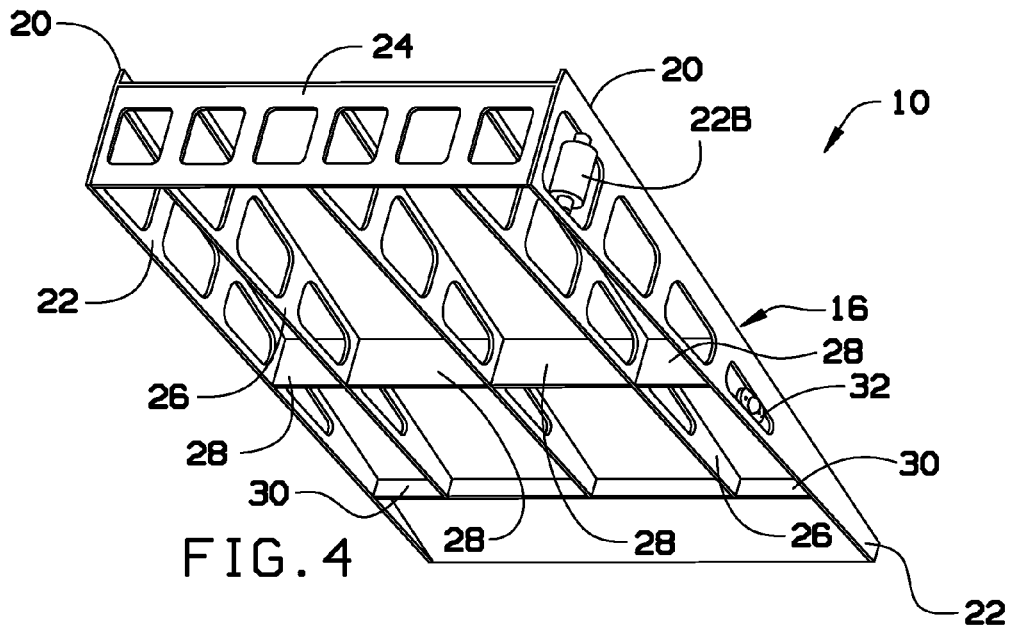
FIG. 4 is a bottom perspective view of the curb ramp of FIG. 2.
Figure 5:
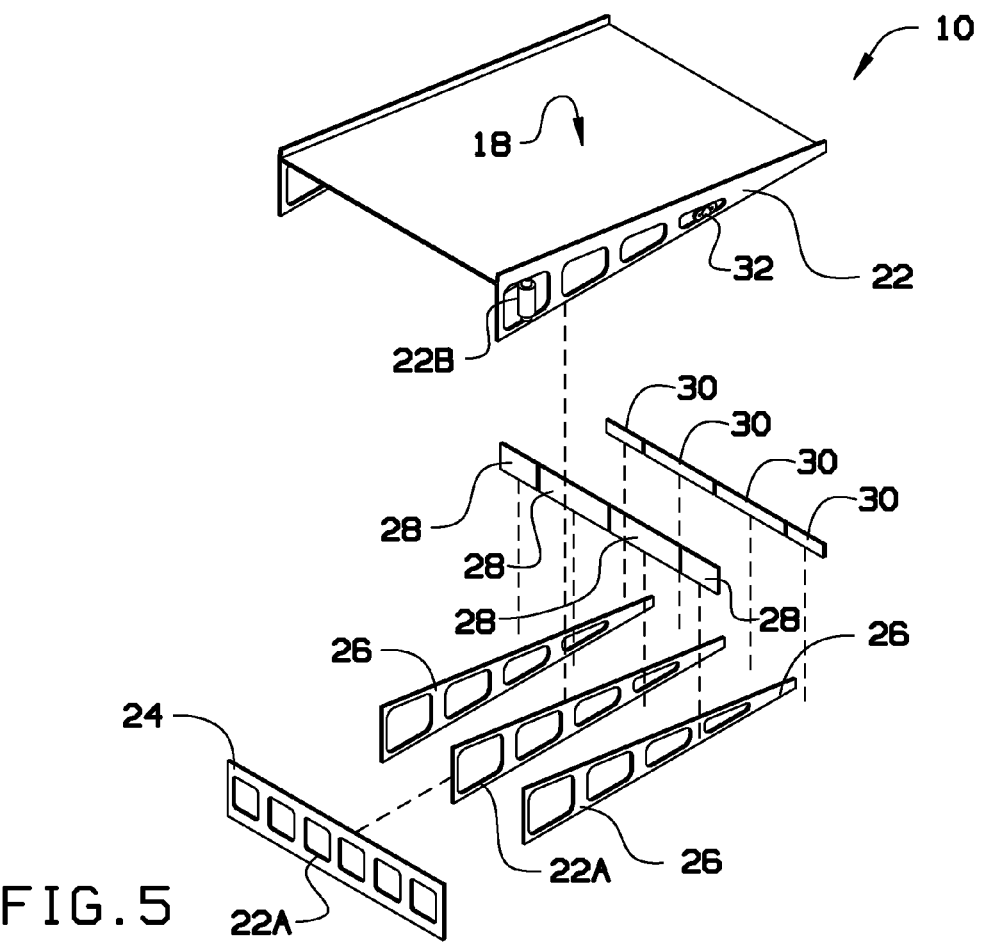
FIG. 5 is an exploded perspective view of the curb ramp of FIG. 2.

A plurality of braces can be disposed under the deck platform 18. These braces can include one or more short braces 28, an end brace 30 and a plurality of long internal braces 26. The plurality of braces can form a grid pattern under the deck platform 18 as shown in FIG. 4. While the Figures show three long internal braces 26, as few as two long internal braces 26 or as many as six or more long internal braces 26 can be used. Similar, while only one short brace 28 is shown in the Figures, two or more short braces 28 can be used.

The curb stop piece 24, the side supports 22 and the long internal braces 26 can include perforations 22A cut therein. These perforations 22A can be formed to reduce the weight of the ramp assembly 16 while maintaining structural integrity.

Roller bearings 22B can be disposed on one or both of the side supports 22. Ball transfer units 32 can also be disposed on one or both of the side supports 22. Typically, two roller bearings 22B can be displayed on one or both of the side supports 22, or one roller bearing 22B and one ball transfer unit 32 (as shown in the Figures) can be disposed on one or both of the side supports 22, or two ball transfer units 32 can be disposed on one or both of the side supports 22. The roller bearings 22B and the ball transfer units 32 can be placed near each end of the side supports 22 to allow the ramp assembly 16 to be rolled on its side along the roller bearings 22B and/or the ball transfer units 32.

The deck platform 18 can be made in various lengths and widths. For a curb ramp for carts, such as horticultural carts, the deck platform 18 can be made from about 49 to about 54 inches in length, typically about 52 inches in length. The deck platform 18 can have a width of about 30 inches, for example. The curb stop piece 24 can have various heights, depending on the height of the curb or walkway or the like that the deck platform 18 has to extend thereto. Typically, the curb stop piece 24 can be from about 4 inches to about 8 inches high.

The deck platform 18 can be designed to be compliant with the Americans with Disabilities Act (ADA). For example, for each inch of curb, a foot of deck length can be provided. This can results in deck lengths of 60 inches, 72 inches or 84 inches for 5 inch, 6 inch and 7 inch curbs, respectively.

The ramp assembly 16 can be made from various materials. Typically, the ramp assembly 16 is made from a strong, lightweight material, such as aluminum. Of course, other materials can be used, provided they provide a safe and functional curb ramp.

Figure 6:
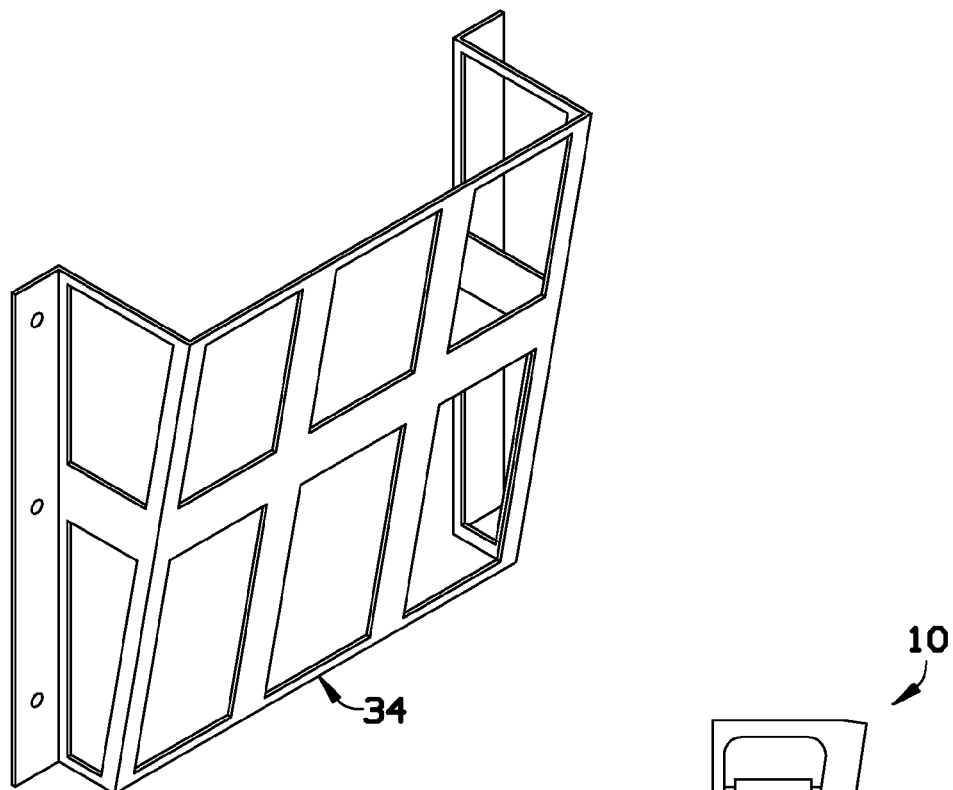
FIG. 6 is a perspective view of a carrying cradle/bracket for securing the curb ramp according to an exemplary embodiment of the present invention.
Figure 7:
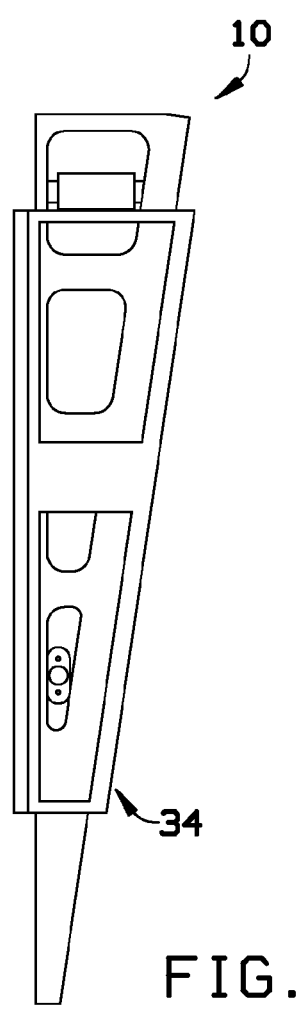
FIG. 7 is a side view of the curb ramp of FIG. 2 stored in the carrying cradle/bracket of FIG. 6.

Referring now to FIGS. 6 and 7, the curb ramp 10 can be disposed in a carrying cradle/bracket 34. In some embodiments, the carrying cradle/bracket 34 can be attached to a wall or other structure to allow placement of the curb ramp 10 therein.

It should be understood, of course, that the foregoing relates to exemplary embodiments of the invention and that modifications may be made without departing from the spirit and scope of the invention as set forth in the following claims.

What is claimed is:

1. A curb ramp comprising:
   a deck platform, the deck platform having a length at least as long as a long wheel base of a cart used on the curb ramp to prevent tail drag of the cart, the deck platform having a lower edge, and a raised edge, opposite the lower edge, the deck platform forming a continuous slope from the lower edge to the raised edge;
   side supports disposed on each side of the deck platform, the side supports extending above an upper plane of the deck platform to prevent a load from sliding off the sides of the deck platform;
   a curb stop piece disposed on the raised edge of the deck platform;
   a plurality of braces disposed under the deck platform;
   a plurality of perforations formed in at least one of the side supports to reduce the weight of the curb ramp while maintaining structural integrity; and
   at least one of a roller bearing and a ball transfer unit attached to at least one of the side supports within at least one of the plurality of perforations and extending from the side support.

2. The curb ramp of claim 1, wherein the deck platform is formed with a non-slip surface.

3. The curb ramp of claim 1, further comprising at least one roller bearing and at least one ball transfer unit extending from at least one of the side supports.

4. The curb ramp of claim 1, wherein the plurality of braces include:
   an end brace;
   at least one short brace; and
   at least one long internal brace.

5. The curb ramp of claim 4, wherein the at least one long internal brace includes at least three long internal braces.

6. The curb ramp of claim 1, further comprising a carrying cradle/bracket operable to receive the curb ramp in a storage/transport position.

* * * * *